US011948159B2

(12) United States Patent
Hormati et al.

(10) Patent No.: US 11,948,159 B2
(45) Date of Patent: Apr. 2, 2024

(54) SCALABLE MATRIX FACTORIZATION IN A DATABASE

(71) Applicant: Google LLC, Mountain View, CA (US)

(72) Inventors: Amir H. Hormati, Kirkland, WA (US); Lisa Yin, Mountain View, CA (US); Umar Ali Syed, Edison, NJ (US); Mingge Deng, Mountain View, CA (US)

(73) Assignee: Google LLC, Mountain View, CA (US)

(*) Notice: Subject to any disclaimer, the term of this patent is extended or adjusted under 35 U.S.C. 154(b) by 351 days.

(21) Appl. No.: 16/843,334

(22) Filed: Apr. 8, 2020

(65) Prior Publication Data

US 2020/0320072 A1    Oct. 8, 2020

Related U.S. Application Data

(60) Provisional application No. 62/830,996, filed on Apr. 8, 2019.

(51) Int. Cl.
| | |
|---|---|
| *G06F 16/332* | (2019.01) |
| *G06F 16/22* | (2019.01) |
| *G06F 16/2453* | (2019.01) |
| *G06F 17/16* | (2006.01) |
| *G06F 18/214* | (2023.01) |
| *G06N 5/04* | (2023.01) |
| *G06Q 30/0201* | (2023.01) |

(52) U.S. Cl.
CPC ....... *G06Q 30/0201* (2013.01); *G06F 16/221* (2019.01); *G06F 16/24535* (2019.01); *G06F 17/16* (2013.01); *G06F 18/214* (2023.01); *G06N 5/04* (2013.01)

(58) Field of Classification Search
CPC .......... G06F 16/00; G06F 16/54; G06F 17/16; G06F 16/2237; G06V 30/194; G06Q 30/02; G06Q 30/0269
USPC ......... 707/767–768, 791–793, 17.051, 17.08
See application file for complete search history.

(56) References Cited

U.S. PATENT DOCUMENTS

| | | | | |
|---|---|---|---|---|
| 6,014,633 | A * | 1/2000 | DeBusk ................. | G06Q 10/06 705/7.12 |
| 6,697,818 | B2 * | 2/2004 | Li ........................ | G06F 16/284 707/999.102 |
| 7,567,262 | B1 * | 7/2009 | Clemens ............... | G06F 16/248 345/632 |
| 8,368,591 | B2 * | 2/2013 | Talbot .................... | G01S 19/44 342/357.27 |
| 9,691,035 | B1 * | 6/2017 | Sandler .............. | G06Q 30/0241 |
| 9,934,134 | B2 * | 4/2018 | Cohen ................ | G06F 11/3684 |
| 10,235,403 | B2 * | 3/2019 | Rossi ..................... | G06Q 30/02 |
| 11,281,969 | B1 * | 3/2022 | Rangapuram .......... | G06V 10/82 |

(Continued)

*Primary Examiner* — Alex Gofman
*Assistant Examiner* — Linh Black
(74) *Attorney, Agent, or Firm* — Honigman LLP; Brett A. Krueger (57) ABSTRACT

Methods, systems, and apparatus, including computer programs encoded on a computer storage medium, for scalable matrix factorization. A method includes obtaining a Structured Query Language (SQL) query to create a matrix factorization model based on a set of training data, generating SQL sub-queries that don't include non-scalable functions, obtaining the set of training data, and generating a matrix factorization model based on the set of training data and the SQL sub-queries that don't include non-scalable functions.

20 Claims, 4 Drawing Sheets

(56) References Cited

U.S. PATENT DOCUMENTS

| | | | |
|---|---|---|---|
| 2002/0116300 A1* | 8/2002 | DeBusk | G16H 40/20 705/29 |
| 2004/0230572 A1* | 11/2004 | Omoigui | G06F 16/36 |
| 2005/0083216 A1* | 4/2005 | Li | G06F 17/147 341/50 |
| 2006/0136462 A1* | 6/2006 | Campos | G06F 16/285 707/999.102 |
| 2006/0218132 A1* | 9/2006 | Mukhin | G06F 16/24553 |
| 2011/0029551 A1* | 2/2011 | Chen | G01D 3/08 711/170 |
| 2012/0041769 A1* | 2/2012 | Dalal | G06Q 10/101 705/1.1 |
| 2013/0246319 A1* | 9/2013 | Tamayo | G06F 16/2465 706/12 |
| 2014/0156231 A1* | 6/2014 | Guo | G06N 7/01 703/2 |
| 2014/0222806 A1* | 8/2014 | Carbonell | G06Q 30/02 707/732 |
| 2014/0280251 A1* | 9/2014 | Somekh | G06F 16/9535 707/754 |
| 2014/0310281 A1* | 10/2014 | Somekh | G06F 16/22 707/737 |
| 2015/0234888 A1* | 8/2015 | Ahmed | G06F 16/2425 707/765 |
| 2015/0278350 A1* | 10/2015 | Nice | G06Q 30/0631 707/754 |
| 2016/0095565 A1* | 4/2016 | Fenchel | A61B 5/113 600/408 |
| 2017/0024391 A1* | 1/2017 | Steck | G06F 16/9535 |
| 2017/0262502 A1* | 9/2017 | Rastunkov | G06F 16/2452 |
| 2017/0331881 A1* | 11/2017 | Chandramouli | G06F 16/24568 |
| 2017/0337481 A1* | 11/2017 | Trouillon | G06N 5/04 |
| 2018/0018590 A1* | 1/2018 | Szeto | G16H 40/20 |
| 2018/0081339 A1* | 3/2018 | Zhu | G05B 13/048 |
| 2018/0082191 A1* | 3/2018 | Pearmain | G06N 20/00 |
| 2018/0211320 A1* | 7/2018 | Kamdar | G06Q 40/06 |
| 2018/0225391 A1* | 8/2018 | Sali | G06F 7/588 |
| 2018/0240041 A1* | 8/2018 | Koch | G06F 16/24578 |
| 2018/0280118 A1* | 10/2018 | Cramer | G16H 20/40 |
| 2019/0080253 A1* | 3/2019 | Lokare | G06N 3/08 |
| 2019/0251435 A1* | 8/2019 | Shiebler | G06N 5/022 |
| 2019/0266257 A1* | 8/2019 | Natchu | G06F 16/137 |
| 2020/0159848 A1* | 5/2020 | Yeo | G06N 20/00 |
| 2020/0242444 A1* | 7/2020 | Zhang | G06N 3/006 |
| 2020/0410157 A1* | 12/2020 | van de Kerkhof | G06F 40/166 |

\* cited by examiner

| block | factor | feature | weight |
|-------|--------|---------|--------|
| jade  | 1      | steak   | 1      |
|       |        | dog     | 2      |
|       |        | frog    | 3      |
|       |        | flower  | 4      |

| block | factor | feature | weight |
|-------|--------|---------|--------|
| jade  | 4      | steak   | 4      |
|       |        | dog     | 3      |
|       |        | frog    | 2      |
|       |        | flower  | 1      |

ML.DOT_PRODUCT ([p2, 4, 3, 1], [3, 1, 2, 4])

Entry for 1, 4 in y_t_vector

| block | factor | feature | weight | partition |
|-------|--------|---------|--------|-----------|
| jade  | 1      | steak   | 1      | 1         |
|       |        | dog     | 2      | 1         |
|       |        | frog    | 3      | 1         |
|       |        | flower  | 4      | 2         |

| block | factor | feature | weight | partition |
|-------|--------|---------|--------|-----------|
| jade  | 4      | steak   | 4      | 1         |
|       |        | dog     | 3      | 1         |
|       |        | frog    | 2      | 1         |
|       |        | flower  | 1      | 2         |

Partition and sort by feature

ML.DOT_PRODUCTML.DOT_PRODUCT
([2, 3, 1], [3, 2, 4])    ([4], [1])

Sum (15, 5)

Entry for 1, 4 in y_t_vector

SCALABLE MATRIX FACTORIZATION IN A DATABASE

CROSS-REFERENCE TO RELATED APPLICATION

This application claims the benefit of U.S. Application No. 62/830,996, filed Apr. 8, 2019, which is incorporated by reference in its entirety.

BACKGROUND

Matrix factorization is a class of collaborative filtering algorithms used in recommender systems.

SUMMARY

This document describes techniques, methods, systems, and other mechanisms for scalable matrix factorization. Matrix factorization can be used in recommender systems. A recommender system may be a model that predicts a "rating" or "preference" that a user might give to an item. Collaborative filtering is a technique used in recommender systems which filters for information or patterns assuming that users who have the same taste tend to like the same items.

Collaborative filtering is based on the assumption that users that like certain items like the items due to liking an inherent or latent set of features or factors about the item and each item contains its own inherent or latent set of features or factors that characterize the item. Mathematically, this translates to having a user-factor vector and item-factor vector which results in how the user feels about the item when the dot product of these two vectors is taken. Matrix factorization is an algorithmic representation of that idea.

Matrix factorization may be implemented in a scalable way in a database through various standard scalable database operations. For example, matrix factorization may be implemented in a Structured Query Language (SQL) using various queries that don't include non-scalable functions. Accordingly, implementing matrix factorization in a SQL based system with only scalable SQL functions may enable scalable matrix factorization in a database.

One innovative aspect of the subject matter described in this specification is embodied in methods that include the actions of obtaining a Structured Query Language (SQL) query to create a matrix factorization model based on a set of training data, generating SQL sub-queries that don't include non-scalable functions, obtaining the set of training data, and generating a matrix factorization model based on the set of training data and the SQL sub-queries that don't include non-scalable functions.

These and other versions may each optionally include one or more of the following features. For instance, in some implementations, generating a matrix factorization model based on the set of training data and the SQL sub-queries that don't include non-scalable functions includes defining, based on the training data, a model table, defining, based on the training data, a data model table, and generating the matrix factorization model based on both the model table and the data model table. In certain aspects, generating the matrix factorization model based on both the model table and the data model table includes determining two vectors based on both the model table and the data model table and generating the matrix factorization model based on a dot product of the two vectors.

In some aspects, generating the matrix factorization model based on both the model table and the data model table includes determining matrices based on the dot product of the two vectors, providing the matrices to a linear solver, obtaining item vectors from the linear solver, and generating the matrix factorization model based on the item vectors. In some implementations, generating SQL sub-queries that don't include non-scalable functions includes generating the SQL sub-queries such that all functions called in the SQL sub-queries are scalable.

In certain aspects, obtaining a Structured Query Language (SQL) query to create a matrix factorization model based on a set of training data includes obtaining a SQL query that specifies a model type, a source of the set of training data, a number of factors, a rating column in the set of training data, a user column in the set of training data, and an item column in the set of training data. In some aspects, the training data indicates ratings that users gave to items, and the matrix factorization model provides, for each of the users, predictions of ratings that the user would give to items for which the user did not give a rating.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
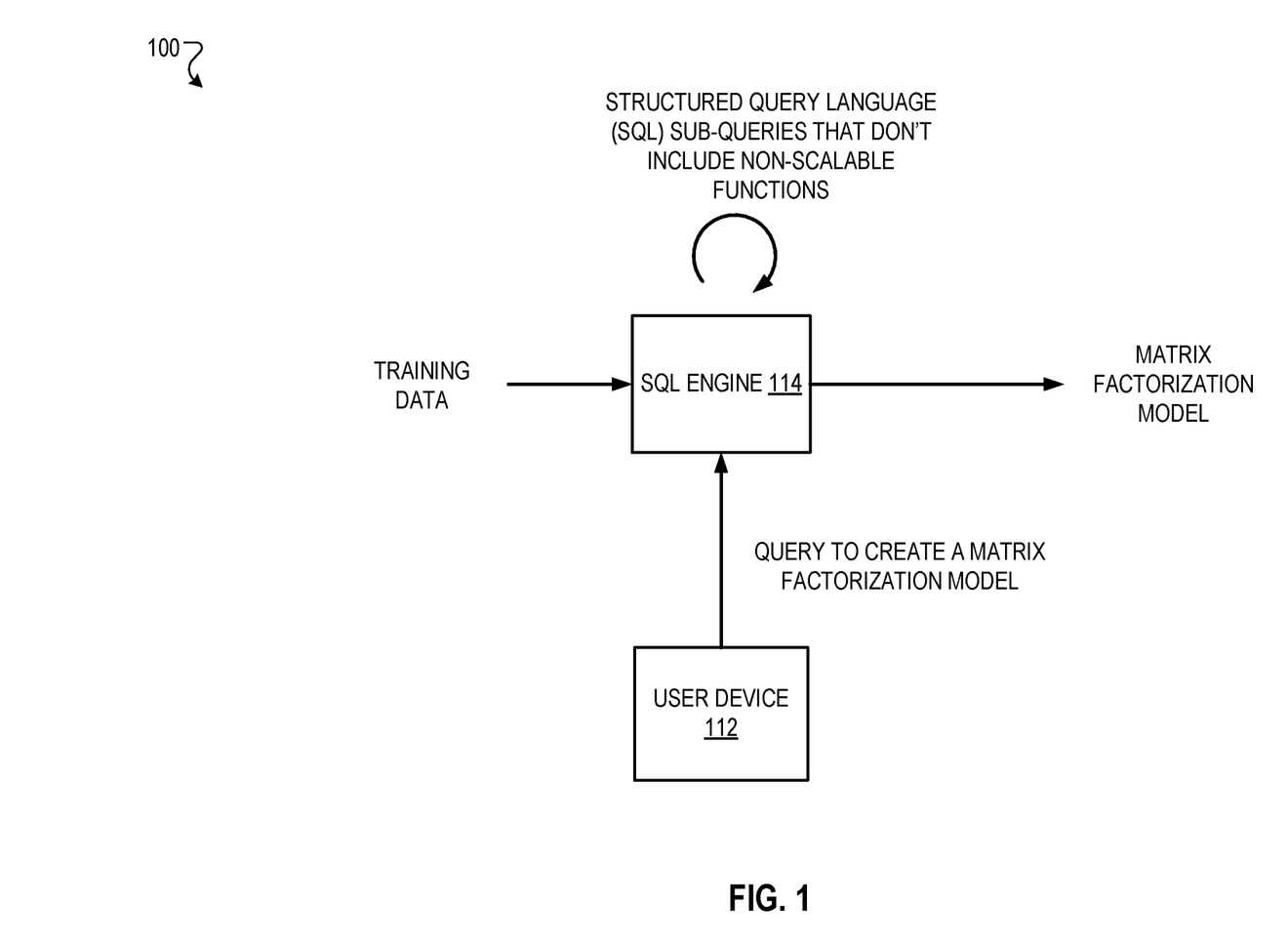
FIG. 1 is a block diagram of an example system for scalable matrix factorization.

FIG. 1 is a block diagram of an example system 100 for scalable matrix factorization. Briefly, the system 100 includes a SQL engine 114 that receives, from a user device 112, a SQL query to create a matrix factorization model and, in response, creates the matrix factorization model.

The user device 112 may be a computing device used by a user to input an instruction to create a matrix factorization machine learning model. For example, a user may input a SQL query of "CREATE MODEL dataset.movie_recommendations(model_type='matrix_factorization', num_factors=10, rating_col='rating', user_col='movie_goer', item_col='movie') AS SELECT rating, movie_goer, movie FROM dataset.movie_data" into the user device 112 and the user device 112 may then send the SQl query to the SQL engine 114. In the example, the SQL query may instruct the SQL engine 114 to create matrix factorization model that uses ten factors to predict a rating that a particular movie goer would give to a particular movie based on training data that includes movies, movie goers, and ratings that the movie goers gave to the movies.

The SQL engine 114 may receive the query and generate sub-queries that don't include non-scalable functions based on the query. For example, the SQL engine 114 may create a sub-query that creates a model table by pre-ordering a portion of the training data so that a scalar dot product function may be used instead of more expensive unnest and join functions.

The SQL engine 114 may then execute the sub-queries and create the matrix factorization model. For example, the SQL engine 114 may obtain the training data, execute the sub-queries using the training data, and then create the matrix factorization model from the execution of the sub-queries.

Figure 2A:
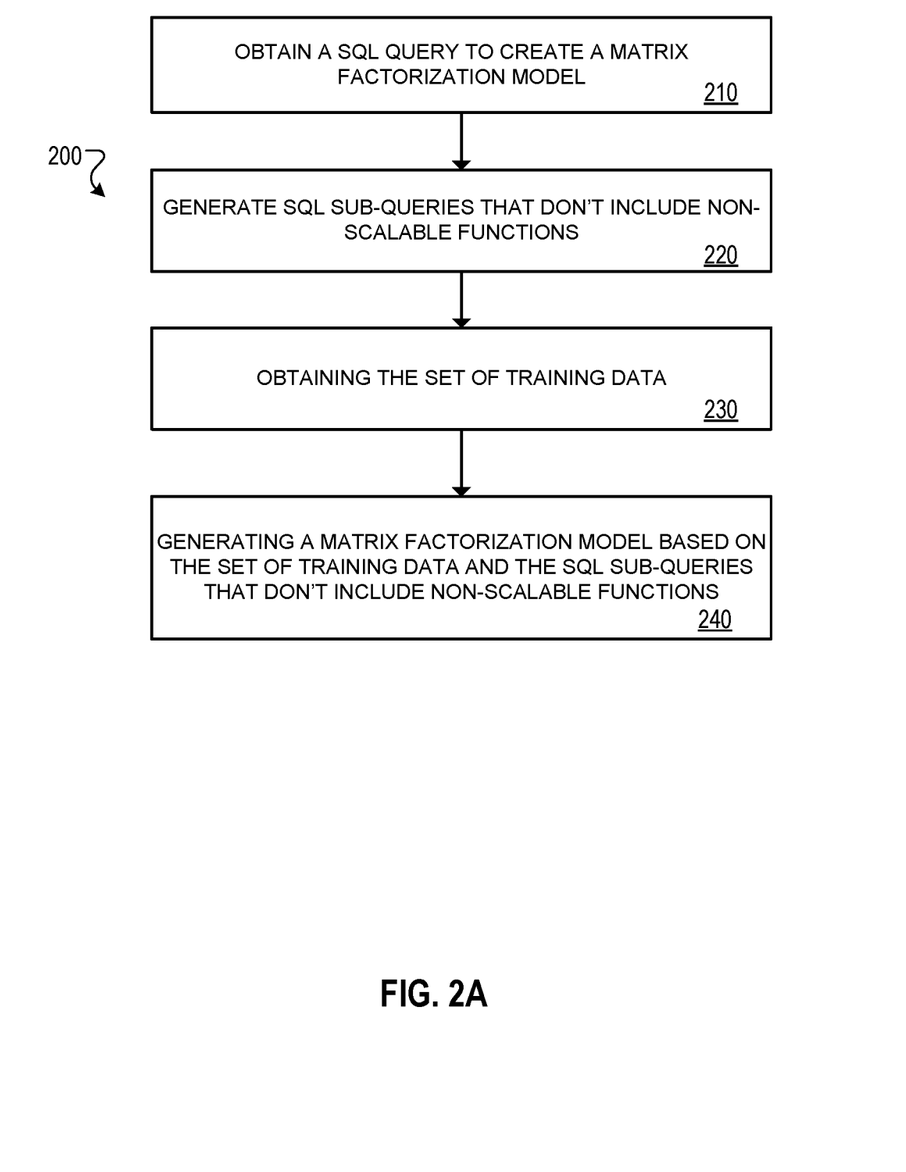
FIG. 2A is a flow diagram that illustrates an example of a process for scalable matrix factorization.

FIG. 2 is a flow diagram that illustrates an example of a process 200 for scalable matrix factorization. The process 200 may be performed by one or more computing devices, such as the one or more computing device that implement the SQL engine 114.

The process 200 includes obtaining a Structured Query Language (SQL) query to create a matrix factorization model based on a set of training data (210). For example, the SQL engine 114 may receive the query "CREATE MODEL dataset.movie_recommendations (model_type='matrix_factorization', num_factors=10, rating_col='rating', user_col='movie_goer', item_col='movie') AS SELECT rating, movie_goer, movie FROM dataset.movie_data" from the user device 112.

In some implementations, obtaining a Structured Query Language (SQL) query to create a matrix factorization model based on a set of training data includes obtaining a SQL query that specifies a model type, a source of the set of training data, a number of factors, a rating column in the set of training data, a user column in the set of training data, and an item column in the set of training data. For example, in the query above "model_type" specifies the model type of "matrix_factorization," "num_factors" specifies ten factors, "rating_col" specifies that the rating column is named "rating" in the training data, "user_col" specifies that the user column is named "movie_goer" in the training data, and "item_col" specifies that the item column is named "movie" in the training data.

In some implementations, the training data indicates ratings that users gave to items, and the matrix factorization model provides, for each of the users, predictions of ratings that the user would give to items for which the user did not give a rating. For example, the training data may be a table that includes a table where each row specifies a user, an item, and a rating that the user gave the item, where the training data doesn't include a row for every pair of user and item, and the matrix factorization model predicts what a rating would be for a pair of user and item.

The process 200 includes generating SQL sub-queries that don't include non-scalable functions (220). For example, the SQL engine 114 may generate a SQL sub-query to multiply two matrices that does not include non-scalable functions. In some implementations, generating SQL sub-queries that don't include non-scalable functions includes generating the SQL sub-queries such that all functions called in the SQL sub-queries are scalable. For example, the SQL engine 114 may generate SQL sub-queries that include various SQL calls and parameters, where all of the SQL calls are scalar.

The process 200 includes obtaining the set of training data (230). For example, the SQL engine 114 may obtain the training data from a database in response to executing the sub-queries.

The process 200 includes generating a matrix factorization model based on the set of training data and the SQL sub-queries that don't include non-scalable functions (240). For example, the SQL engine 114 may execute all the sub-queries and as a result generate the matrix factorization model.

In some implementations, generating a matrix factorization model based on the set of training data and the SQL sub-queries that don't include non-scalable functions includes defining, based on the training data, a model table, defining, based on the training data, a data model table, and generating the matrix factorization model based on both the model table and the data model table. For example, the SQL engine 114 may generate the model table and the data model table in parallel, and then determine the matrix factorization model based on the model table and the data model table.

In some implementations, generating the matrix factorization model based on both the model table and the data model table includes determining two vectors based on both the model table and the data model table and generating the matrix factorization model based on a dot product of the two vectors. For example, the SQL engine 114 may determine two vectors from the model table and the data model table, determine the dot product of the vectors, and then generate the matrix factorization model based on the dot product.

In some implementations, generating the matrix factorization model based on both the model table and the data model table includes determining matrices based on the dot product of the two vectors, providing the matrices to a linear solver, obtaining item vectors from the linear solver, and generating the matrix factorization model based on the item vectors. For example, the SQL engine 114 may determine matrices based on the dot products of the two vectors, call a SQL function for a linear solver using two matrices as parameters, obtain item vectors from the linear solver in response to the call, and then generate the matrix factorization model based on the item vectors.

In an example of using the process 200 for matrix factorization, three columns may be used as input; the "user" column, "item" column, and a "value" column. As a result, a CREATE MODEL call might look like this:

```
CREATE MODEL dataset.movie_recommendations(
    model_type='matrix_factorization', num_factors=10,
    rating_col='rating', user_col='movie_goer',
    item_col='movie') AS
    SELECT rating, movie_goer, movie FROM dataset.movie_data
```

Num_factors and model_type may be required fields, and input_* can potentially depend on their data. If the data already has columns called rating, user, and item, they may not need it, but otherwise they can specify it. These options may be similar to input_label_cols.

Alternating Least Squares (ALS) is an algorithm that can be used to solve matrix factorization problems. For reference, a derivation of a formula follows. The solution may be rederived to include the intercepts. The goal of this derivation may be to get the final equation to look like one of an equation that is fed into a linear solver. To do so the cost function may be rewritten with the following substitutions to solve for the user weights and intercept:

$$r_{ui}^{\gamma} \leftarrow r_{ui} - \gamma_i$$

$$\underline{x_u} \leftarrow (x_u, \beta_u)$$

$$\underline{y_i} \leftarrow (y_i, 1)$$

So the cost function looks like:

$$C = \Sigma_{u,i \in observed\ ratings}(r_{ui}^{\gamma} - \underline{x_u}^T \underline{y_i})^2 + \lambda(\Sigma_u(\|x_u\|^2) + \Sigma_i (\|y_i\|^2 + \gamma_i^2))$$

The last term of $$\frac{dC}{d\underline{x_u}}$$

containing the $y_i$ and $\gamma_i$ go to zero leaving:

$$\frac{dC}{d\underline{x_u}} = -2 \sum_{i \in observed\ ratings\ for\ user\ u} (r_{ui}^{\gamma} - \underline{x_u}^T \underline{y_i}) \underline{y_i} + 2\lambda \underline{x_u}$$

Scalar dot products are commutative, so the equation is rearranged to:

$$\frac{dC}{d\underline{x_u}} = -2 \sum_{i \in observed\ ratings\ for\ user\ u} (r_{ui}^{\gamma} - \underline{y_i}^T \underline{y_i}) \underline{y_i} + 2\lambda \underline{x_u}$$

This may be rewritten in matrix form where $r_u^{\gamma}$ is a vector that contains element $r_{ui}^{\gamma}$ for item i, each row of $\underline{Y}$ is $\underline{y_i}^T$ if i is observed for the user zero otherwise:

$$\frac{dC}{d\underline{x_u}} = -2\underline{Y}r_u^{\gamma} + 2\underline{Y}^T\underline{Y}\underline{x_u} + 2\lambda \underline{x_u}$$

Setting that to zero:

$$(\underline{Y}^T \times \underline{Y} + \lambda I)\underline{x_u} = \underline{Y}^T \gamma_u^{\gamma}$$

Similarly:

$$(\underline{X}^T \times \underline{X} + \lambda I)\underline{y_i} = \underline{X}^T r_i^{\beta}$$

$(\underline{X}^T + \underline{X} + \lambda I)$ might be different for every i, as $\underline{x_u}$ may only be included in $\underline{X}$ if u,i was an observed value. This may leave a few problems to resolve since this may result in a significant change to the training. $(\underline{X}^T + \underline{X} + \lambda I)$ may be computed for every i and it may need to scale.

The bulk of the work for training may occur in a single query; the model weight query. The overall query may look like:

```
WITH model_table AS (
  SELECT
    data.item AS block,
    model.factor AS factor,
    ARRAY_AGG(model.weight
    ORDER BY
      model.feature) AS y_t_vector
  FROM (
    SELECT
      feature,
      factor,
      IF(factor = "___INTERCEPT___", 1.0, weight) AS weight
    FROM
      'dataset.table_temp_user' model
    JOIN
      'dataset.table_training_imported_data' data
    ON
      model.feature = data.user
    GROUP BY
      block,
      factor),
  data_model_table AS (
  SELECT
    data.item AS block,
    model.feature AS row,
    model.factor AS column,
    model.weight AS value,
    data.rating AS rating
  FROM (
    SELECT
      feature,
      factor,
      IF(factor = "___INTERCEPT___", 1.0, weight) AS weight
    FROM
      'dataset.table_temp_user' model
    JOIN (
      SELECT
        data.user,
        data.item,
        data.rating - weights.intercept AS rating
      FROM
        'dataset.table_training_imported_data' data
      JOIN (
        SELECT
          feature,
          weight AS intercept
        FROM
          'dataset.table_temp_user'
        WHERE
          factor = "___INTERCEPT___") weights
      ON
        data.user = weights.feature) data
    ON
      model.feature = data.user)
  SELECT
    feature,
    solution.factor AS factor,
    solution.weight AS weight
  FROM (
    SELECT
      block AS feature,
      (
      SELECT
        ARRAY_AGG(STRUCT(matrix_row_index AS factor,
          matrix_value AS weight))
      FROM
        ML.LINEAR_SOLVER( (
          SELECT
            *
          FROM
            UNNEST(a.matrix)),
          (
          SELECT
            *
          FROM
            UNNEST(b.matrix)))) AS solution
    FROM (
      SELECT
        block,
        ARRAY_AGG(STRUCT(column AS matrix_row_index,
          "1" AS matrix_column_index,
          value AS matrix_value)) AS matrix
      FROM (
        SELECT
          block,
          column,
          SUM(rating * value) AS value
        FROM
          data_model_table
```

-continued

```
    GROUP BY
      block,
      column)
    GROUP BY
      block ) AS b
    JOIN (
      SELECT
        block,
        ARRAY_AGG(STRUCT( matrix_row_index,
          matrix_column_index,
          IF (matrix_row_index = matrix_column_index,
    matrix_value + @l2_reg, matrix_value) AS matrix_value)) AS matrix
      FROM (
        SELECT
          block,
          a_model.factor AS matrix_row_index,
          b_model.factor AS matrix_column_index,
          ML.DOT_PRODUCT(a_model.y_t_vector,
            b_model.y_t_vector) AS matrix_value
        FROM
          model_table a_model
        JOIN
          model_table b_model USING (block))
      GROUP BY
        block ) AS a USING(block)) t,
    t.solution;
```

This may be broken down as outlined below. The input data may be assumed to look like the below:

| user | item    | rating |
|------|---------|--------|
| Adam | Aladdin | 5      |
| Adam | Bambi   | 4      |
| Adam | Cars    | 3      |
| Bec  | Aladdin | 4      |
| Bec  | Cars    | 5      |

Two tables may be defined at the top of the function; model_table and data_model_table. These tables may be mainly used as set up to place the necessary vectors next to each other. model_table may set up the computation for $\underline{Y}^T\underline{Y}$ for all u looks like the following:

```
WITH model_table AS (
  SELECT
    data.user AS block,
    model.factor AS factor,
    ARRAY_AGG(model.weight ORDER BY model.feature) AS
      y_t_vector
  FROM (
    SELECT
      feature,
      factor,
      IF(factor = "___INTERCEPT___", 1.0, weight) AS weight
    FROM
      'dataset.table_temp_item' model
    JOIN
      'dataset.table_training_imported_data' data
    ON
      model.feature = data.item
  GROUP BY
    block,
    factor)
```

Each row of $\underline{Y}^T$ is ordered by the feature. The y_t_vector may be preordered so that the scalar function, ML.DOT_PRODUCT which will produce a dot product by multiplying two input vectors in order and avoid expensive UNNEST+ JOIN combinations, can be called. This may rely on the fact that each feature may be unique and the same features will be left out for a given user/item for all of the rows of $\underline{Y}^T$.

$\underline{y}_i \leftarrow (y_i, 1)$ may be computed. Each $\underline{y}_i$ may be created. The full $y_i$ model table may be joined against the input data in order to drop any items that a user hasn't rated and vice versa. Places in the query are swapped out when alternating in the weight computation. A user/block column allows computing $\underline{Y}^T\underline{Y}$ for all users with one query.

The resulting table may look something like this:

| block | factor | y_t_vector      |
|-------|--------|-----------------|
| Adam  | 1      | [0.2, 0.1, 0.3] |
| Adam  | 2      | [0.1, 0.3, 0.3] |
| Bec   | 1      | [0.3, 1.0]      |
| Bec   | 2      | [0.6, 0.1]      |

The data_model_table may set up the computation $\underline{Y}^T r_u^y$ as follows:

```
data_model_table AS (
  SELECT
    data.user AS block,
    model.feature AS row,
    model.factor AS column,
    model.weight AS value,
    data.rating AS rating
  FROM (
    SELECT
      feature,
      factor,
      IF(factor = "___INTERCEPT___", 1.0, weight) AS weight
    FROM
      'dataset.table_temp_item' model
    JOIN (
      SELECT
        data.user,
        data.item,
        data.rating - weights.intercept AS rating
      FROM
        'dataset.table_training_imported_data' data
      JOIN (
        SELECT
          feature,
          weight AS intercept
        FROM
          'dataset.table_temp_item'
        WHERE
          factor = "___INTERCEPT___") weights
      ON
        data.item = weights.feature) data
    ON
      model.feature = data.item)
```

$r_{ui}^y \leftarrow r_{ui} - y_i$ may be calculated. The resulting table may look something like this:

| block | row     | column | weight | rating |
|-------|---------|--------|--------|--------|
| Adam  | Aladdin | 1      | 0.2    | 5      |
| Adam  | Bambi   | 1      | 0.1    | 4      |
| Adam  | Cars    | 1      | 0.3    | 3      |
| Adam  | Aladdin | 2      | 0.1    | 5      |
| Adam  | Bambi   | 2      | 0.3    | 4      |
| Adam  | Cars    | 2      | 0.3    | 3      |
| Bec   | Aladdin | 1      | 0.3    | 4      |
| Bec   | Cars    | 1      | 1.0    | 5      |
| Bec   | Aladdin | 2      | 0.6    | 4      |
| Bec   | Cars    | 2      | 0.1    | 5      |

The actual computation of $\underline{Y}^T\underline{Y} + \lambda I$ for all u may look like:

```
SELECT
  block,
  ARRAY_AGG(STRUCT( matrix_row_index,
    matrix_column_index,
```

```
        IF (matrix_row_index = matrix_column_index,
            matrix_value + @l2_reg,
            matrix_value) AS matrix_value)) AS matrix
    FROM (
        SELECT
            block,
            a_model.factor AS matrix_row_index,
            b_model.factor AS matrix_column_index,
            ML.DOT_PRODUCT(a_model.y_t_vector,
                b_model.y_t_vector) AS
matrix_value
        FROM
            model_table a_model
        JOIN
            model_table b_model USING (block))
        GROUP BY
            block
```

Each reduced item model is joined with itself for every user. $\underline{Y}^T\underline{Y}$ is computed for every user. $\underline{Y}^T\underline{T}+\lambda I$ is computed. The data is aggregated in a way that ML.LINEAR_SOLVER expects the table to look like. It is effectively an f×f matrix. The resulting table looks something like this:

| block | matrix |
|-------|--------|
| Adam  | [{1, 1, 0.14}, {1, 2, 0.14} {2, 1, 0.14}, {2, 2, 0.19}] |
| Bec   | [{1, 1, 1.09}, {1, 2, 0.28}, {2, 1, 0.28}, {2, 2, 0.56}] |

The actual computation for $\underline{Y}^T r_u^y$ looks like:

```
SELECT
    block,
    ARRAY_AGG(STRUCT(column AS matrix_row_index,
        "1" AS matrix_column_index,
        value AS matrix_value)) AS matrix
FROM (
    SELECT
        block,
        column,
        SUM(rating * value) AS value
    FROM
        data_model_table
    GROUP BY
        block,
        column)
GROUP BY
    block
```

| block | matrix |
|-------|--------|
| Adam  | [{1, 1, 2.3}, {2, 1, 2.6}] |
| Bec   | [{1, 1, 6.2}, {2, 1, 2.9}] |

An f×1 vector is created for each user that will get joined to the above query and sent to the linear solver.

```
SELECT
    feature,
    solution.factor AS factor,
    solution.weight AS weight
FROM (
    SELECT
        block AS feature,
        (
        SELECT
            ARRAY_AGG(STRUCT(matrix_row_index AS factor,
                matrix_value AS weight))
        FROM
            ML.LINEAR_SOLVER( (SELECT * FROM
                UNNEST(a.matrix)),
                (SELECT * FROM UNNEST(b.matrix)))) AS solution
    FROM
        y_t_y_table AS b
    JOIN
        y_t_r_table AS a USING(block)) t, t.solution
```

Since ML.LINEAR_SOLVER is a TVF and takes in two tables, the arrays that were previously built are unnested. $\underline{Y}^T r_u^y$ vectors are placed next to corresponding $\underline{Y}^T\underline{Y}+\lambda I$ matrix. The final output table would look like:

| block | factor | weight |
|-------|--------|--------|
| Adam  | 1      | 0.4    |
| Adam  | 2      | 0.11   |
| Bec   | 1      | 3.1    |
| Bec   | 2      | 0.2    |

The following may be a model format used:

| item_feature | user_feature | factor_weight | intercept |
|--------------|--------------|---------------|-----------|
| Bambi        | NULL         | {"feature": 1, "value": 1.6}, {"feature": 2, "value": 0.3} | 0.1 |
| NULL         | Amir         | {"feature": 1, "value": 2.1}, {"feature": 2, "value": 1.2} | 0.4 |

Instead of saving each factor as its own row, factors for each item and user may be saved into an array. For convenience, the intercept may be saved as its own column. A benefit from this representation is that ML.RECOMMEND may be written in a way that uses a cross-apply instead of a join, which will allow the query to finish.

In some implementations, an input dataset may be as follows:

| Column | Allowed Types |
|--------|---------------|
| user   | Any groupable type |
| item   | Any groupable type |
| rating | Numeric |

The rating_col name may be mapped as the label_column_name so a separate name for the rating column may not be needed. The dataset may be strictly checked for three columns if data split isn't custom or seq and four columns if it is. The input columns may be "user", "item" or "rating" verbatim, or specified using training options. Restriction might be loosed if all three columns are specified in OPTIONS.

Prediction for matrix factorization is a little different from prediction for K-Means and Generalized Linear Model. Namely, with the model itself, the user-item ratings that were passed in during training may be predicted. The unseen data in the matrix factorization case is the missing user-item values. Since matrix factorization determines two lower dimensional matrices, if multiplied by two, all the user-item rating values after prediction may be obtained. Thus, prediction may be run with only one input and also SELECT*FROM ML.PREDICT(model dataset.movie_recommendations) and SELECT*FROM ML.PREDICT (model dataset.movie_recommendations, table)

The second version of predict may filter out the first call based on the users and items that are in the given columns assuming they match the columns at training. For example, given the overall prediction table generated below for every separately seen user and movie example in training:

| movie_goer\movie | A   | B   | C   | D   |
|------------------|-----|-----|-----|-----|
| Adam             | 1.3 | 2.0 | 1.3 | 4.2 |
| Barb             | 2.3 | 1.2 | 4.2 | 2.4 |
| Charlie          | 4.3 | 2.1 | 3.3 | 1.1 |
| Diane            | 2.3 | 4.2 | 1.2 | 1.0 |

SELECT*FROM ML.PREDICT(model dataset.movie_recommendations) would return the entire table. If an input table was given and it only contained one column; movie_goer and two rows, Adam and Barb, then ML.PREDICT would return the yellow cells. If the input table only contained one column; movie and two rows, A and B, then ML.PREDICT would return the blue outlined cells.

Finally, if the input table looked like this:

| movie_goer | movie |
|------------|-------|
| Adam       | C     |
| Barb       | A     |
| Barb       | D     |
| Diane      | D     |

Then the output would be:

| predicted_rating    | movie_goer | movie |
|---------------------|------------|-------|
| 1.5269506389842873  | 460        | 251   |
| 0.9252882202876869  | 342        | 748   |

The user and item column names match the initial user and item columns that were passed in and cast to the original type of the column. To do this, a user and item ColType may be added to the column info in model.proto.

Figure 2B:
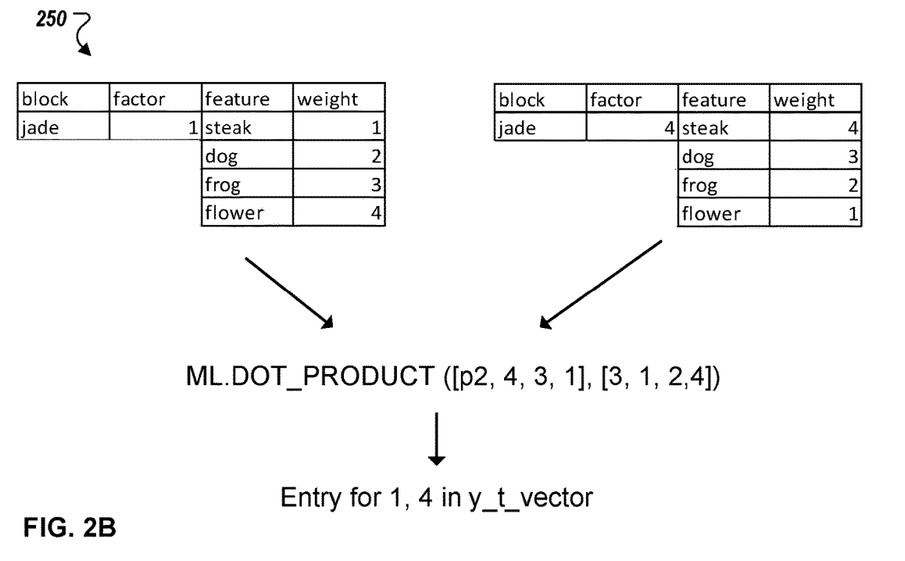
FIGS. 2B and 2C illustrate an example of sharding in a process for scalable matrix factorization.
Figure 2C:
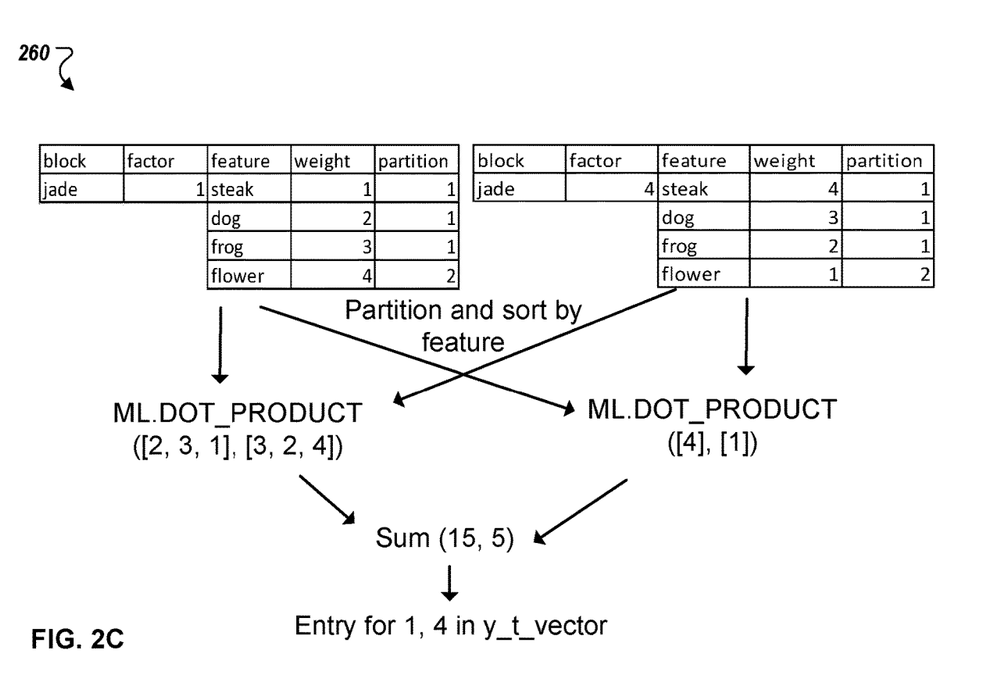

FIGS. 2B and 2C illustrate an example of a sharding in a process for scalable matrix factorization. In some implementations, due to the maximum size limit of a row, there can be an issue when constructing the y_t_vector if an item/user has too many user/item ratings. Each row may need to be less than 100 Mb. This issue may be compounded when ML.DOT_PRODUCT is called because the vector is joined with another vector that is the same size as itself and passed to the expression function. Thus, the maximum size of y_t_vector may be approximately 50 mb which, where y_t_vector is an array of floats, translates to around 780 k floats. This may not be a limit on the total number of unique items or users; it may be a limit on the maximum number of items that a single user has rated and the maximum number of users that have rated a single item which can be much less than the total number of unique items or users.

Since ML.DOT_PRODUCT may avoid joining the feature names when computing YtY by sorting the arrays prior to computation because it's agnostic to order, a process may continue to take advantage of that and shard the y_t_vectors, run ML.DOT_PRODUCT on each of the smaller arrays and then aggregate the result at the end to build the same YtY matrix. FIG. 2B shows on a high level how a single entry in the y_t_vector for a single user/block may be calculated and FIG. 2C shows on a high level a revision using sharding.

Assuming each feature gets a partition number, the SQL query may be modified to look like the below:

```
WITH model_table AS (
SELECT
    data.item AS block,
    model.factor AS factor,
    data.user_partition_index AS partition_index,
    ARRAY_AGG(model.weight
    ORDER BY
        model.feature) AS y_t_vector,
    ANY_VALUE(data.item_count) AS count
FROM (
    SELECT
        feature,
        factor,
        IF(factor = 0, 1.0, weight) AS weight
    FROM
        'dataset.table_temp_item' ) model
JOIN
    'dataset.table_training_imported_data' data
ON
    model.feature = data.user
GROUP BY
    block,
    factor,
    partition_index)
...
SELECT
    block,
    ARRAY_AGG(STRUCT( matrix_row_index,
        matrix_column_index,
        IF (matrix_row_index = matrix_column_index,
            matrix_value + @l2_reg,
            matrix_value) AS matrix_value)) AS matrix
FROM (
    SELECT
        block,
        matrix_row_index,
        matrix_column_index,
        SUM(matrix_value) AS matrix_value,
        ANY_VALUE(count) AS count
    FROM (
        SELECT
            block,
            a_model.factor AS matrix_row_index,
            b_model.factor AS matrix_column_index,
            a_model.partition_index AS partition_index,
            ML.DOT_PRODUCT(a_model.y_t_vector,
                b_model.y_t_vector) AS matrix_value,
            IF (a_model.count < 1, 1, a_model.count) AS count
        FROM
            model_table a_model
        JOIN
            model_table b_model USING(block)
        WHERE
            a_model.partition_index = b_model.partition_index)
    GROUP BY
        block,
        matrix_row_index,
        matrix_column_index)
GROUP BY
    block
```

The 'partition_index' may be generated during import to ensure that every feature has the same index in the same block. This may be done in the following manner:

```
SELECT
    user_id AS user,
    item_id AS item,
    rating - @___PARAMETER___global___intercept___ AS rating,
    user_count,
    item_count,
    CAST(ROUND(RAND( ) * item_count / 150000) + 1 AS INT64) AS
```

```
user_partition_index,
    CAST(ROUND(RAND( ) * user_count / 150000) + 1 AS INT64) AS
item_partition_index
FROM (
    SELECT
        *,
        COUNT(1) OVER (PARTITION BY user) AS user_count,
        COUNT(1) OVER (PARTITION BY item) AS item_count
    FROM
        'dataset.table_frozen_data')
```

Each example is given a random partition depending on the item and user count for the user and item. The partition index will be used when calculating the YtY for each block. This partition index is dependent on both the number of items a user has rated or vice versa and the maximum number of floats to restrict y_t_vector to. If the approximate maximum is set to 150 k, then since the id is between 0-1, by multiplying it by the user or item count, and then dividing by 150 k, the same user_partition_index is generated for the same user and the same item_partition_index for the same item. If there are less than 150 k items that a user has rated, this partition_index will always be 1, so the array isn't partitioned unless necessary and the arrays for different user blocks or item blocks can be partitioned differently.

For example, if the maximum number of items in an array is restricted to two, the following partition indices are determined:

| user | item | rating | user_count | rand_user | user_partition_index | item_count | rand_item | item_partition_index |
|------|------|--------|------------|-----------|----------------------|------------|-----------|----------------------|
| jade | dog | 5 | 4 | 0 | 1 | 2 | 0 | 1 |
| jade | steak | 3 | 4 | 0.1 | 1 | 1 | 0.1 | 1 |
| jade | frog | 2 | 4 | 0.2 | 1 | 1 | 0.2 | 1 |
| jade | flower | 4 | 4 | 0.3 | 1 | 1 | 0.3 | 2 |
| john | dog | 2 | 3 | 0.4 | 1 | 2 | 0.4 | 2 |
| john | hammer | 4 | 3 | 0.5 | 1 | 1 | 0.5 | 2 |
| john | cake | 1 | 3 | 0.6 | 1 | 1 | 0.6 | 2 |

The range of item_partition_index is one to two while user_parition_index is mostly one. This is because the users have more ratings, four, than any item, two. (There are three items in item_partition_index one in order to generate partitions that matched an earlier example.)

Figure 3:
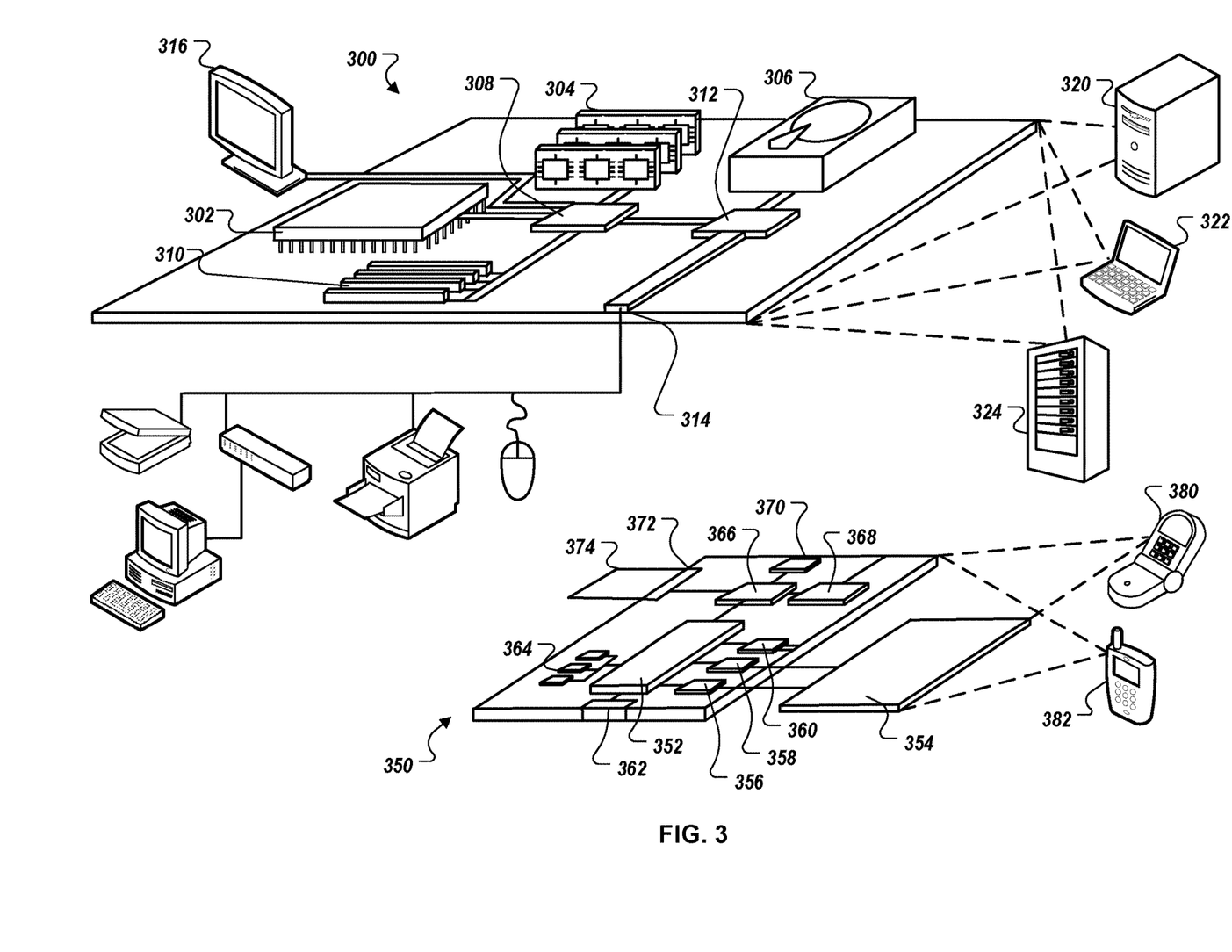
FIG. 3 is a block diagram of computing devices that may be used to implement the systems and methods described in this document, as either a client or as a server or plurality of servers.

FIG. 3 is a block diagram of computing devices 300, 350 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

Additionally computing device 300 or 350 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   obtaining, from a user device, a Structured Query Language (SQL) query to create a matrix factorization model based on a set of training data, the SQL query comprising:
      a model type; and
      a source of the set of training data;
   generating, using the SQL query, a plurality of SQL sub-queries; and
   executing the plurality of SQL sub-queries;
   based on executing the plurality of SQL sub-queries:
      obtaining the set of training data from the source;
      determining, based on the set of training data, a model vector;
      determining, based on the set of training data, a data vector;
      pre-ordering the model vector and the data vector;
      determining, based on a maximum number of floats for the pre-ordered model vector and the pre-ordered data vector, a partition index;
      partitioning, based on the partition index, the pre-ordered model vector into a first pre-ordered model sub-vector and a second pre-ordered model sub-vector;
      partitioning, based on the partition index, the pre-ordered data vector into a first pre-ordered data sub-vector and a second pre-ordered data sub-vector;
      determining a first dot product between the first pre-ordered model sub-vector and the first pre-ordered data sub-vector and a second dot product between the second pre-ordered model sub-vector and the second pre-ordered data sub-vector;
      generating the matrix factorization model based on the first dot product and the second dot product; and
      executing the matrix factorization model.

2. The method of claim 1, further comprising:
   defining, based on the training data, a model table; and
   defining, based on the training data, a data table.

3. The method of claim 2, wherein:
   determining the model vector comprises determining the model vector based on the model table; and
   determining the data vector comprises determining the data vector based on the data table.

4. The method of claim 3, wherein generating the matrix factorization model based on the first dot product and the second dot product comprises:
   determining matrices based on the first dot product and the second dot product;
   providing the matrices to a linear solver;
   obtaining item vectors from the linear solver; and
   generating the matrix factorization model based on the item vectors.

5. The method of claim 1, wherein generating the plurality of SQL sub-queries comprises generating the plurality of SQL sub-queries using only scalable functions.

6. The method of claim 1, wherein the SQL query further comprises:
   a number of factors;
   a rating column in the set of training data;
   a user column in the set of training data; and
   an item column in the set of training data.

7. The method of claim 1, wherein:
   the training data indicates ratings that users gave to items; and
   the matrix factorization model provides, for each respective user of the users, predictions of ratings that the respective user would give to items for which the respective user did not give a rating.

8. A system comprising:
   one or more computers and one or more storage devices storing instructions that are operable, when executed by the one or more computers, to cause the one or more computers to perform operations comprising:
      obtaining, from a user device, a Structured Query Language (SQL) query to create a matrix factorization model based on a set of training data, the SQL query comprising:
         a model type; and
         a source of the set of training data;
      generating, using the SQL query, a plurality of SQL sub-queries; and
      executing the plurality of SQL sub-queries;
      based on executing the plurality of SQL sub-queries:

obtaining the set of training data from the source;
determining, based on the set of training data, a model vector;
determining, based on the set of training data, a data vector;
pre-ordering the model vector and the data vector;
determining, based on a maximum number of floats for the pre-ordered model vector and the pre-ordered data vector, a partition index;
partitioning, based on the partition index, the pre-ordered model vector into a first pre-ordered model sub-vector and a second pre-ordered model sub-vector;
partitioning, based on the partition index, the pre-ordered data vector into a first pre-ordered data sub-vector and a second pre-ordered data sub-vector;
determining a first dot product between the first pre-ordered model sub-vector and the first pre-ordered data sub-vector and a second dot product between the second pre-ordered model sub-vector and the second pre-ordered data sub-vector;
generating the matrix factorization model based on the first dot product and the second dot product; and
executing the matrix factorization model.

9. The system of claim 8, wherein the operations further comprise:
defining, based on the training data, a model table; and
defining, based on the training data, a data table.

10. The system of claim 9, wherein:
determining the model vector comprises determining the model vector based on the model table; and
determining the data vector comprises determining the data vector based on the data table.

11. The system of claim 10, wherein generating the matrix factorization model based on the first dot product and the second dot product comprises:
determining matrices based on the first dot product and the second dot product;
providing the matrices to a linear solver;
obtaining item vectors from the linear solver; and
generating the matrix factorization model based on the item vectors.

12. The system of claim 9, wherein generating the plurality of SQL sub-queries comprises generating the plurality of SQL sub-queries using only scalable functions.

13. The system of claim 9, wherein the SQL query further comprises:
a number of factors;
a rating column in the set of training data;
a user column in the set of training data; and
an item column in the set of training data.

14. The system of claim 9, wherein:
the training data indicates ratings that users gave to items; and
the matrix factorization model provides, for each respective user of the users, predictions of ratings that the respective user would give to items for which the respective user did not give a rating.

15. A non-transitory computer-readable medium storing software comprising instructions executable by one or more computers which, upon such execution, cause the one or more computers to perform operations comprising:
obtaining, from a user device, a Structured Query Language (SQL) query to create a matrix factorization model based on a set of training data, the SQL query comprising:
a model type; and
a source of the set of training data;
generating, using the SQL query, a plurality of SQL sub-queries; and
executing the plurality of SQL sub-queries;
based on executing the plurality of SQL sub-queries:
obtaining the set of training data from the source;
determining, based on the set of training data, a model vector;
determining, based on the set of training data, a data vector;
pre-ordering the model vector and the data vector;
determining, based on a maximum number of floats for the pre-ordered model vector and the pre-ordered data vector, a partition index;
partitioning, based on the partition index, the pre-ordered model vector into a first pre-ordered model sub-vector and a second pre-ordered model sub-vector;
partitioning, based on the partition index, the pre-ordered data vector into a first pre-ordered data sub-vector and a second pre-ordered data sub-vector;
determining a first dot product between the first pre-ordered model sub-vector and the first pre-ordered data sub-vector and a second dot product between the second pre-ordered model sub-vector and the second pre-ordered data sub-vector;
generating the matrix factorization model based on the first dot product and the second dot product; and
executing the matrix factorization model.

16. The medium of claim 15, further comprising:
defining, based on the training data, a model table; and
defining, based on the training data, a data table.

17. The medium of claim 16, wherein:
determining the model vector comprises determining the model vector based on the model table; and
determining the data vector comprises determining the data vector based on the data table.

18. The medium of claim 17, wherein generating the matrix factorization model based on the first dot product and the second dot product comprises:
determining matrices based on the first dot product and the second dot product;
providing the matrices to a linear solver;
obtaining item vectors from the linear solver; and
generating the matrix factorization model based on the item vectors.

19. The medium of claim 16, wherein generating the plurality of SQL sub-queries comprises generating the plurality of SQL sub-queries using only scalable functions.

20. The medium of claim 16, wherein the SQL query further comprises:
a number of factors;
a rating column in the set of training data;
a user column in the set of training data; and
an item column in the set of training data.

* * * * *